United States Patent [19]
Richter

[11] Patent Number: 5,899,112
[45] Date of Patent: May 4, 1999

[54] ROTARY/LINEAR CONVERTER

[75] Inventor: Paul Anthony Richter, New Farm, Australia

[73] Assignee: Richter Technology Limited, Australia

[21] Appl. No.: 08/750,282

[22] PCT Filed: May 22, 1995

[86] PCT No.: PCT/AU95/00281

§ 371 Date: Nov. 27, 1996

§ 102(e) Date: Nov. 27, 1996

[87] PCT Pub. No.: WO95/33148

PCT Pub. Date: Dec. 7, 1995

[30] Foreign Application Priority Data

| | | | |
|---|---|---|---|
| May 27, 1994 | [AU] | Australia | PM5906 |
| Nov. 11, 1994 | [AU] | Australia | PM9391 |
| Nov. 15, 1994 | [AU] | Australia | PM9454 |

[51] Int. Cl.[6] .......................... F16H 21/50; F16H 21/52; F16H 21/54
[52] U.S. Cl. .................. 74/99 R; 74/20; 74/89; 74/102; 92/31; 92/33
[58] Field of Search ................... 74/45, 102, 89, 74/99 R, 103, 105, 96, 20; 92/31, 33, 68

[56] References Cited

U.S. PATENT DOCUMENTS

| 4,133,215 | 1/1979 | Norris et al. ............................ 92/31 X |
| 4,796,514 | 1/1989 | Richter ...................................... 92/33 |

FOREIGN PATENT DOCUMENTS

| 2700-194 | 7/1977 | Germany ................................... 92/31 |
| 13766 | 4/1900 | Sweden .................................... 92/31 |

*Primary Examiner*—Charles A. Marmor
*Assistant Examiner*—Ankur Parekh
*Attorney, Agent, or Firm*—Cesari and McKenna, LLP

[57] ABSTRACT

A rotary/linear converter comprising a reciprocator having a main axis (A) and being adapted for reciprocating movement in the direction of the main axis (A) and a rotator adapted for rotating movement about the main axis (A), the converter further including converter means which operatively interconnects the reciprocator and the rotator. The converter means includes a control link having one end portion thereof pivotally connected to another part of the converter means and the other end portion pivotally connected to a mounting, the link being adapted to pivotally oscillate about the mounting in response to movement of one of said either the rotator or the reciprocator thereby causing movement of the other.

30 Claims, 15 Drawing Sheets

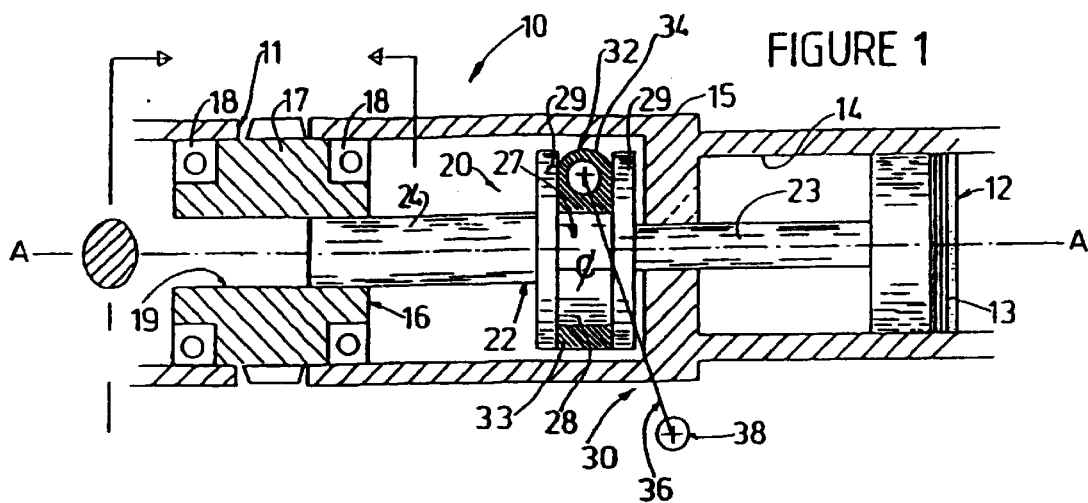
FIGURE 1
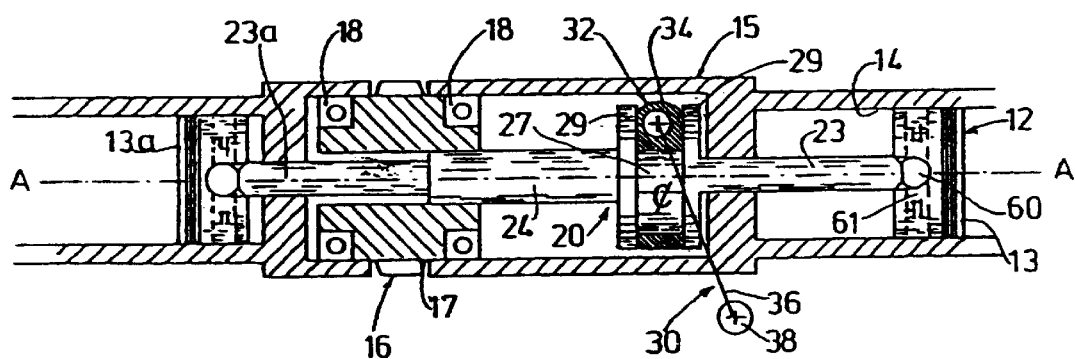
FIGURE 2
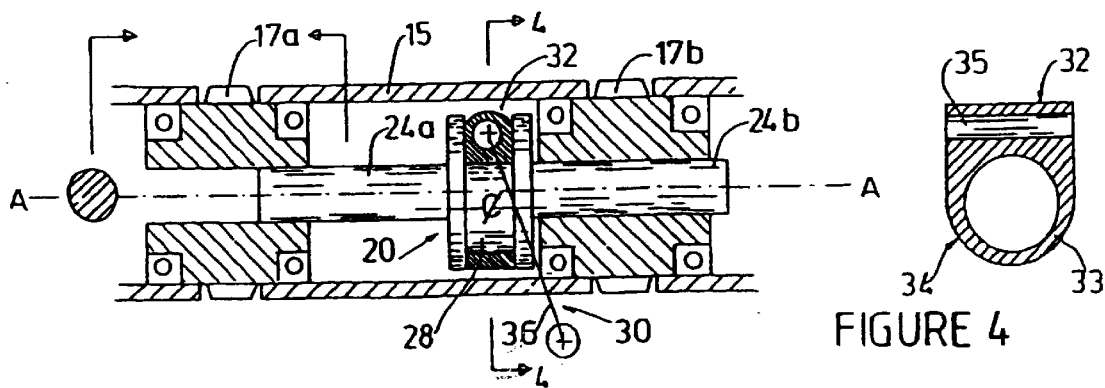
FIGURE 3
FIGURE 4

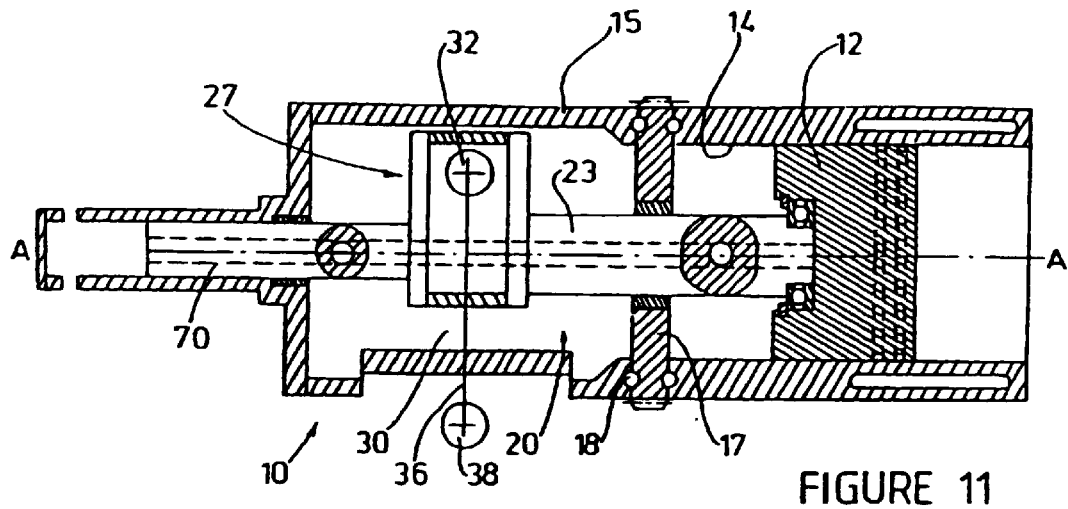
FIGURE 11
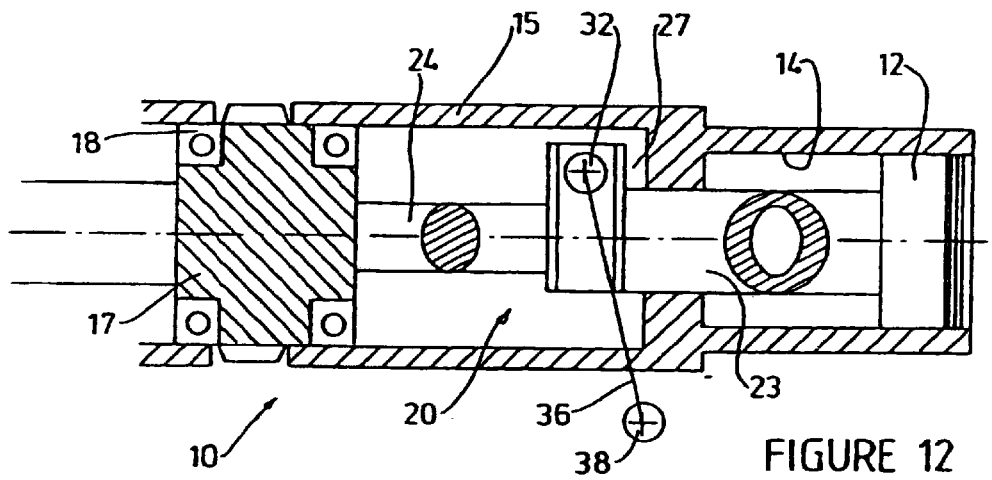
FIGURE 12
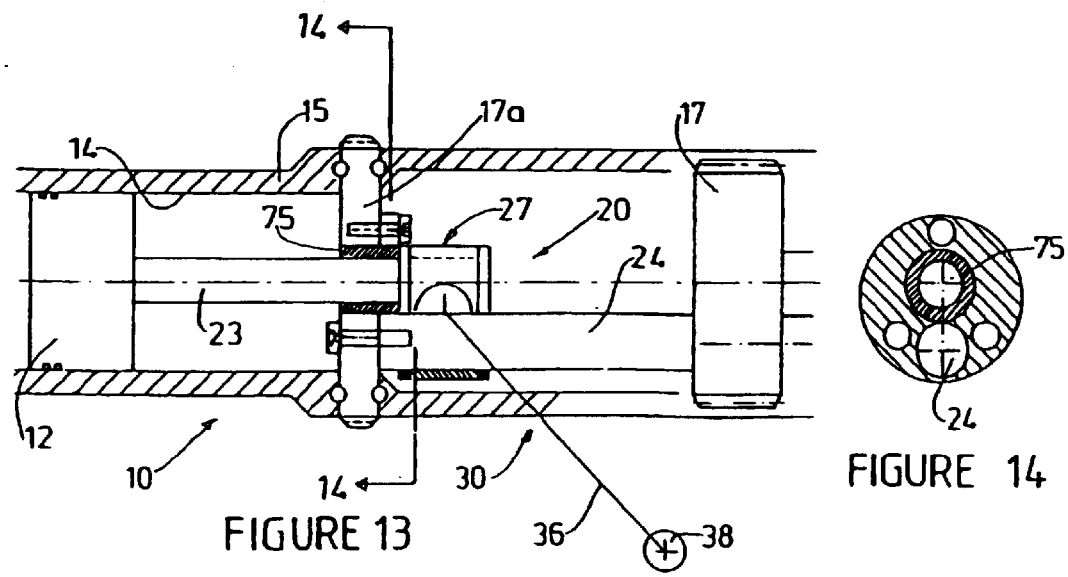
FIGURE 13
FIGURE 14

ROTARY/LINEAR CONVERTER

This invention relates to apparatus for converting linear motion to rotary motion and vice versa. The invention is applicable to a wide variety of uses and may for example be operated by fluids arranged to act on or transmit fluids. Examples of such uses include engines, motors, pumps, generators, compressors and the like. The fluid may be of a compressible or expandable nature such as for example a gas or gas mixture or may be in the form of an incompressible fluid where it may be used in hydraulic applications.

In U.S. Pat. No. 4,796,514 there is described a device for converting rotary motion into linear motion and vice versa wherein a unique coupling mechanism was provided for the motion conversion. In the device described in the aforementioned US patent there is provided a piston arranged for linear movement within a cylinder and a rotatable disc with a connecting mechanism operatively connecting the piston to the disc so that respective linear or rotational movement of one member causes the respective linear or rotational movement of the other member. The connecting mechanism comprises a sleeve which is operatively connected to the piston for reciprocating movement therewith. The sleeve is arranged for sliding movement on a shaft operatively connected to the disc. Both the sleeve and shaft are offset from the central axis of the piston and disc. A control link is operatively connected to the sleeve so as to cause orbital movement of the shaft about the central axis in response to movement of one of either the piston or the disc.

Whilst the device described in this patent specification has been found to operate satisfactorily it contains a relatively large number of moving parts and as such is relatively complicated in construction. One problem of the device described in the aforementioned patent is that the part connected to the piston is axially offset from the central axis. This can cause forces to be applied to the parts resulting in undesirable friction between the moving parts.

An object of the present invention is to provide an improved rotary/linear converter which is relatively simple in construction.

According to one aspect of the present invention there is provided a rotary/linear converter comprising a reciprocator having a main axis and being adapted for reciprocating movement in the direction of the main axis and a rotator adapted for rotating movement about the main axis, the converter further including converter means which operatively interconnects the reciprocator and the rotator and comprising a reciprocating section operatively connected to the reciprocator and substantially co-axial with the main axis thereof, a rotating section operatively connected to the rotator and a control section, a control link having one end portion thereof pivotally connected to said control section with its pivot axis offset with respect to said main axis and the other end portion pivotally connected to a mounting, said link adapted to pivotally oscillate about said mounting in response to movement of one of either said rotator or said reciprocator thereby causing movement of the other of said rotator or said reciprocator. As used within this specification the term pivot connection includes within its scope generally universal movement at the connection point between the two parts.

Preferably the reciprocating section of the converter means has a longitudinal axis which is co-axial with the main axis of the reciprocator. The rotating section of the converter means has a longitudinal axis which may in one form be co-axial with the main axis of the reciprocator or in another form be offset from that main axis.

The reciprocator may be in the form of a piston disposed within a cylinder for reciprocating movement relative thereto. The piston/cylinder assembly may be provided for use in an internal or external combustion engine or used for hydraulic fluids and the like. It may further find application in gearing arrangements or other equipment and industrial apparatus. It is not necessary that the reciprocator is a piston. For example, it may simply comprises a shaft mounted for reciprocating motion.

The rotator may be in the form of at least one wheel mounted for rotation about the main axis of the rotator. The wheel may, for example, comprise a gear, or pulley or other device from which power can be delivered to or taken from.

The reciprocating section of the converter means may in one form comprise a shaft or rod having one end operatively connected to the reciprocator. Preferably that end of the shaft is journalled to the reciprocator so that it can rotate relative thereto and the longitudinal axis of the shaft is co-axial with the main axis of the reciprocator which in the preferred form described earlier is a piston.

The rotating section of the converter means may be in the form of a shaft or rod operatively connected to the rotator so that it is capable of reciprocating movement relative thereto but also adapted to rotate therewith. In one embodiment this shaft is disposed co-axially with the main axis of the reciprocator. In this embodiment its cross-section is such that it will be caused to rotate with the rotator. For example the shaft may be oval in cross-section thereby permitting the desired reciprocating movement but be fixed against rotation relative to the rotator which as described earlier may be a wheel.

In another embodiment the longitudinal axis of this shaft is offset from the main axis so that the shaft revolves about the main axis and the rotator can still rotate about the main axis. In addition the shaft can still reciprocate relative to the rotator.

In a preferred embodiment the converter means comprises a unitary body forming the reciprocating, rotating and control sections thereof. The control section may comprise a disc-like element having a central axis offset from the longitudinal axis of a least one but preferably both the reciprocating and rotating sections which in turn are preferably co-axial. The disc is arranged so that in use it is caused to adopt an orbital motion about the main axis of the reciprocator.

The link means may have one end connected to a control section mounting which may comprise a collar or sleeve forming or fitted around a bearing or bushing for receiving the control section and providing for limited rotary movement therebetween. The other end of the link can be mounted to a fixed pivotal mounting which may be formed on the housing of the apparatus or the like. The position of the fixed mounting may be adjustable and/or movable and this may be effected during operation of the application. In this way the length of the stroke of the first member can be varied.

In addition the length of the link arm may be varied in order to vary the stroke. The link operates in response to either reciprocation of the reciprocator or rotation of the rotator to control the movement of the converter means. The pivotal movement of the link means causes the link mounting and the control section to adopt an orbital motion about the main axis as well as a reciprocating motion. These dual motions translate the reciprocating motion of the first member to the rotating motion of the second member and vice-versa.

According to another aspect of the of the present invention there is provided a rotary/linear converter comprising a reciprocator having a main axis and being adapted for reciprocating movement in the direction of the main axis, and a rotator adapted for rotating movement about the main axis, the converter further including converter means which operatively interconnects the reciprocator and the rotator, the converter means comprising a first member operatively connected to the reciprocator in a region substantially co-axial with the main axis, a rotating section operatively connected to the rotator, a coupling link pivotally interconnected between the first section and the rotating section, and a control link having one end portion operating connected to the first section and the other end portion connected to a mounting, said control link being adapted to pivotally oscillate about the mounting in response to movement of one of said rotator or said reciprocator thereby causing movement of the other of said rotator or said reciprocator.

Preferably, the first section of the converter means comprises a connecting rod operatively connected between said reciprocator and one end of said coupling link. The aforementioned one end portion thereof may be pivotally connected to the first section of the converter means between the reciprocator and the coupling link.

Preferably, the rotating section of the converter means has a longitudinal axis which is offset from the main axis of the rotating section and is adapted to revolve about the main axis.

The reciprocator and rotator may be of similar form to that described with reference to the first aspect of the invention.

According to yet another aspect of the present invention there is provided a rotary/linear converter comprising a main body, a reciprocator having a main axis and being adapted for reciprocating movement in the direction of the main axis and a rotator adapted for rotating movement about the main axis, the converter further including converter means which operatively interconnects the reciprocator and the rotator and comprises a control member capable of reciprocating movement relative to the rotator but also adapted to rotate therewith and a control link having one end portion thereof pivotally connected to the control member with its pivot axis offset with respect to the main axis and the other end portion pivotally connected to a mounting. The link is adapted to pivotally oscillate about the mounting in response to movement of one of either the rotator or the reciprocator thereby causing movement of the other of the rotator or the reciprocator. As used within this specification the term pivot connection includes within its scope generally universal movement at the connection point between the two parts in question.

The reciprocator may be in the form of a piston disposed within a cylinder for reciprocating movement relative thereto. Preferably, the cylinder is disposed within or forms part of the main body of the converter. The piston/cylinder assembly may be provided for use in an internal or external combustion engine or used for hydraulic fluids and the like. It may further find application in gearing arrangements or other equipment and industrial apparatus. It is not necessary that the reciprocator is a piston. For example, it may simply comprises a shaft mounted for reciprocating motion.

In one preferred form, the piston comprises a piston head and connecting rod which is operatively connected to the control member. Preferably, the connecting rod includes a rotating section which is rotatable relatively to the piston head and a guide section which operatively engages the inner surface of the cylinder. The guide section may include a guide sleeve with a roller cage and rollers disposed between the guide sleeve and the inner surface of the cylinder. The roller cage may be in the form of that manufactured by T H Cylinder Linear Guides and Roller Cages manufactured by the TSCHUDIN and HIDE AG.

The rotator may in one form comprises a wheel operatively carried by the main body of the device and mounted for rotation about the main axis of the reciprocator. The wheel may for example comprise a gear or pulley or other device from which power can be delivered to or taken from. Roller bearings may be provided for rotatably supporting the rotator wheel within the main body of the device.

The wheel may be in the form of a generally cylindrical member having a chamber therein for receiving the control member and permitting reciprocating motion thereof in the direction of the main axis. The coupling however is inhibited against relative rotation to the wheel.

In one preferred form the control member may comprise a coupling body operatively connected to the reciprocator preferably via the connecting rod, for permitting reciprocating movement therewith. Preferably, the coupling body is disposed within the chamber within the rotator wheel and mounted so as to be movable relative thereto in the axial direction but fixed against relative rotation. A cylinder linear guide of the type described earlier may be provided between the converter member and inner surface of the chamber within the rotator wheel.

The control link may comprise an elongated member having a first ball joint operatively connecting one end of the link to the coupling body and a second ball joint operatively connecting the other end of the link to a mounting. Preferably, the pivot axis of the ball joints are offset with respect to the central axis of the reciprocator. The first ball joint may be receivable within a socket element mounted to the coupling body. The position of the other mounting may be adjustable and/or movable and this may be effected during operation of the converter.

In operation, reciprocating movement of the reciprocator causes the coupling element to reciprocator relative to the rotating wheel and because of the arrangement of the control link, the first ball joint is caused to orbit around the central axis of the reciprocator thereby causing the wheel to rotate.

In another form of the invention the rotator and control member comprise a rotating body disposed within the main body of the apparatus and rotatable relative thereto. The rotating body may be operatively coupled to an output gear through a spline which enables the rotating body to reciprocate relative to the output gear but also causes rotation thereof. The control link for this form of the invention may be generally the same as that described above.

Several preferred embodiments of the invention will hereinafter be described with reference to the accompanying drawings and in those drawings:

FIG. 1 is a schematic partial sectional side elevation of a first form of rotary/linear converter according to the present invention;

FIG. 2 is a similar view of a modification of the embodiment shown in FIG. 1;

FIG. 3 is another form of device according to the present invention;

FIG. 4 is a cross-sectional view taken along the line I—I in FIGS. 2 and 3;

Figure 5:
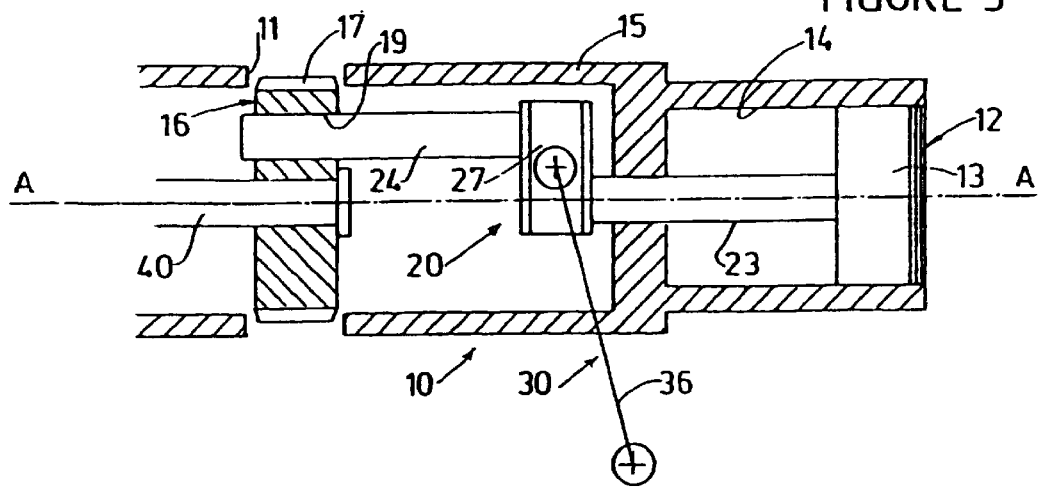
Figure 6:
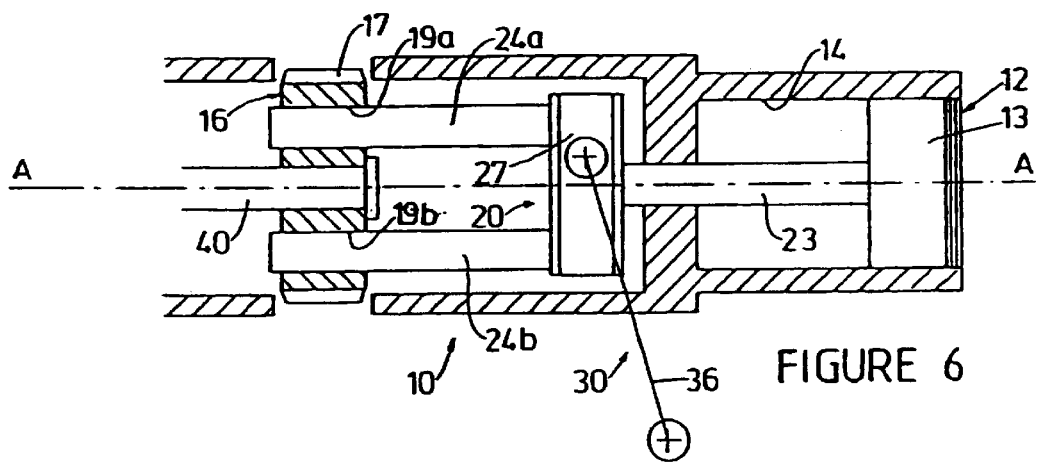
Figure 7:
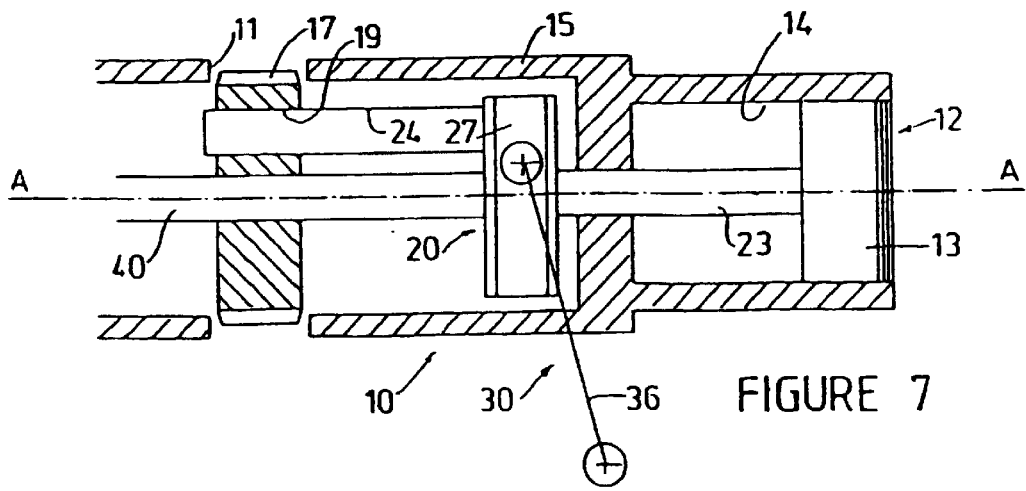
Figure 8:
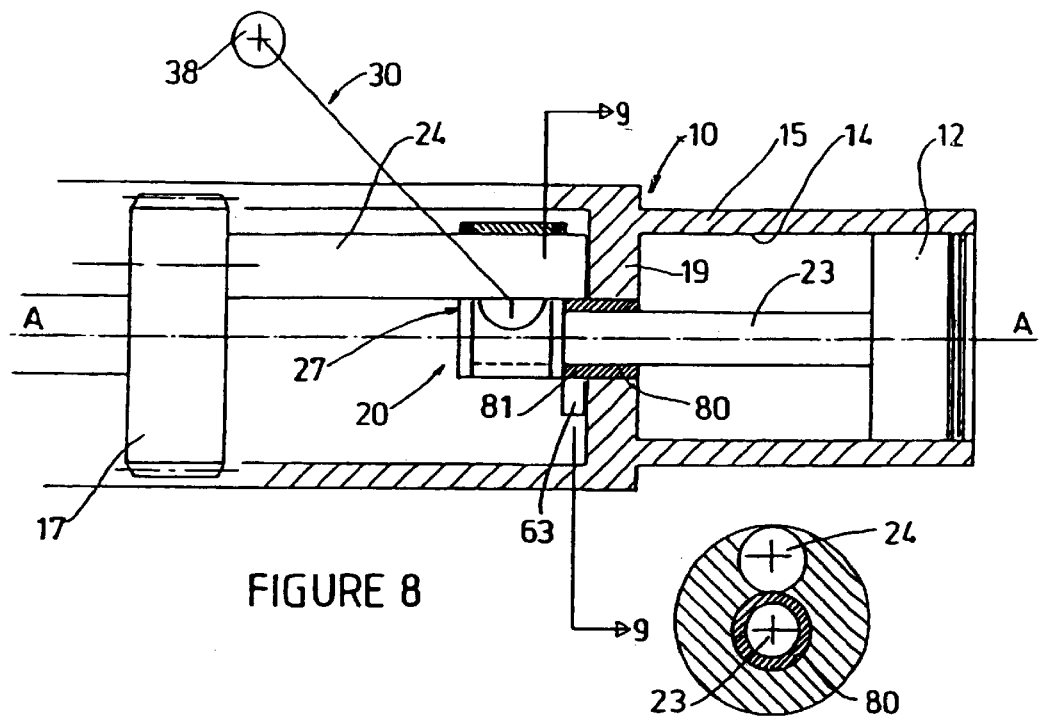
Figure 9:
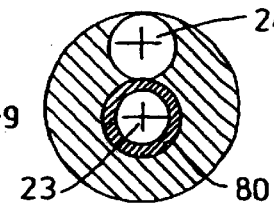
Figure 10:
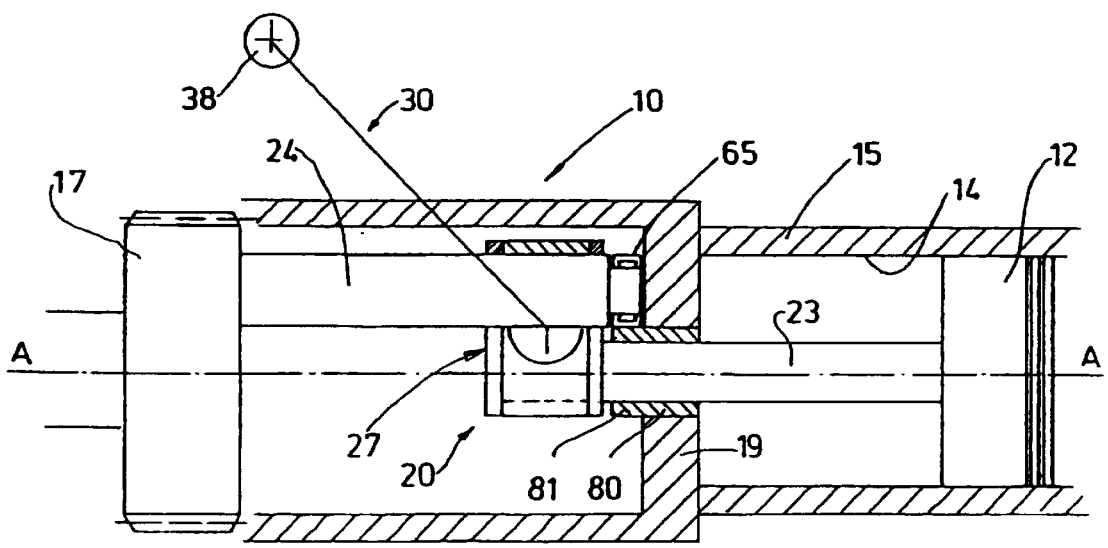
Figure 15:
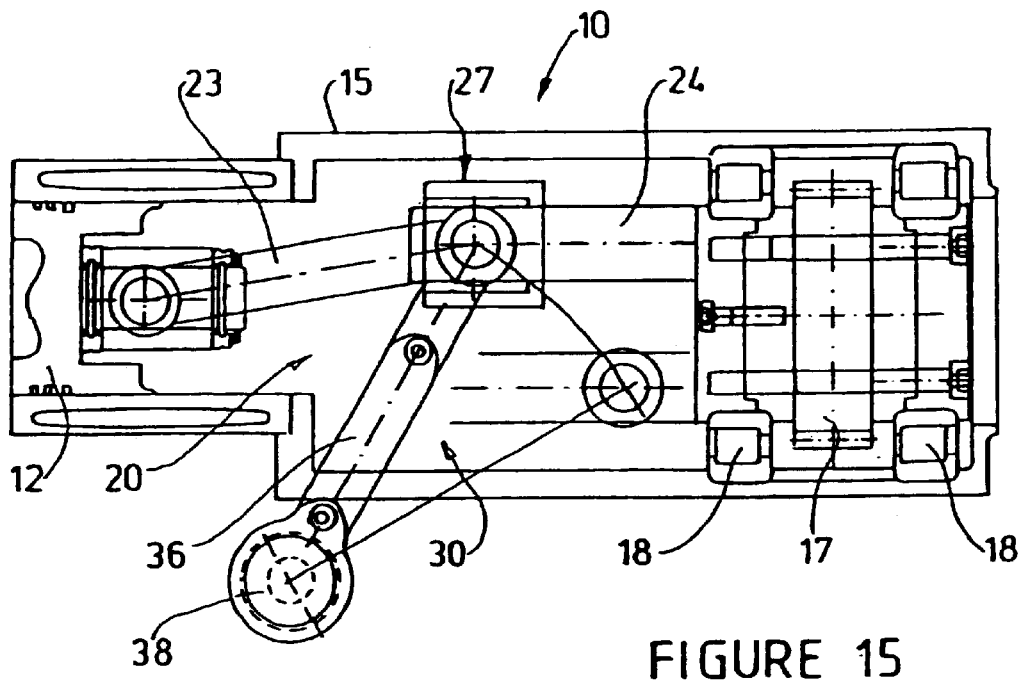
Figure 16:
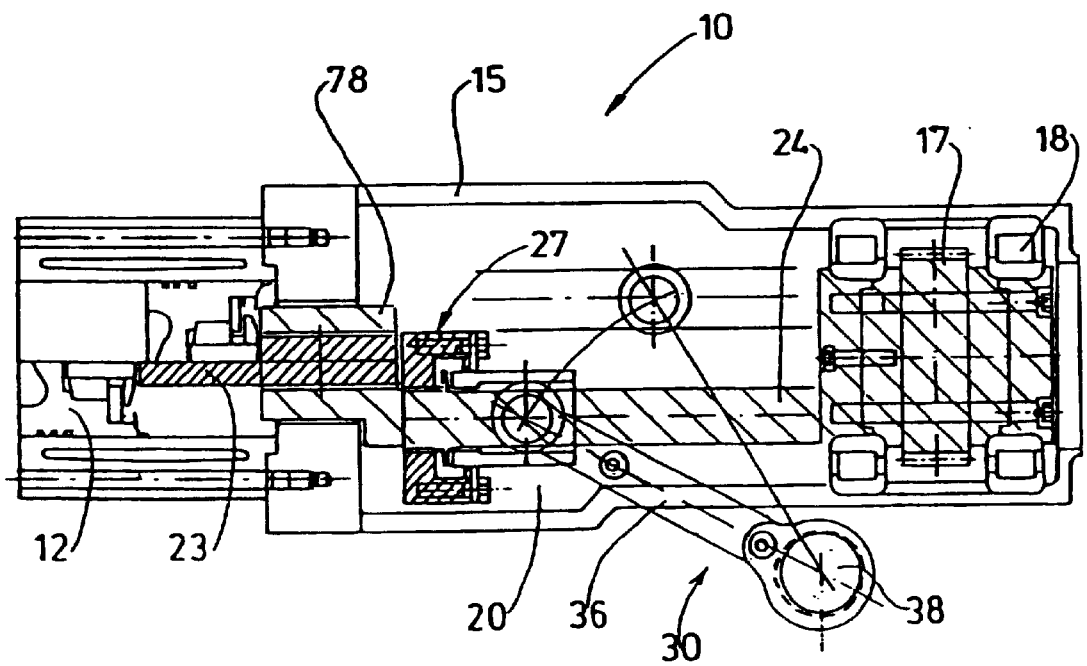

FIG. 5. is a schematic partial sectional side elevation of yet another form of rotary/linear converter according to the present invention;

FIG. 6 is a modification of the device shown in FIG. 5;

FIG. 7 is a further modification of the device shown in FIG. 5;

FIG. 8 is yet another form of device according to the present invention;

FIG. 9 is a sectional view taken along the line Y—Y in FIG. 8;

FIG. 10 is yet another form of device according to the invention;

FIG. 11 is yet another form of device according to the invention;

FIG. 12 is yet another form of device according to the invention;

FIG. 13 is yet another form of device according to the invention;

FIG. 14 is a sectional elevation taken along the line Z—Z in FIG. 13;

FIG. 15 is yet another form of device according to the invention;

FIG. 16 is yet another form of device according to the present invention; and

Figure 17:
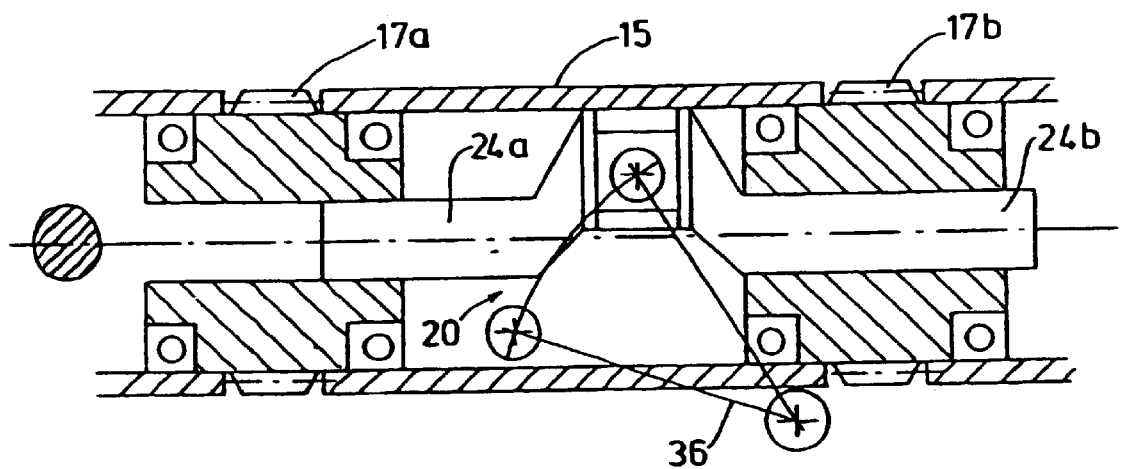

FIG. 17 is a schematic representation of a further form of device similar to that shown in FIG. 3.

Figure 18:
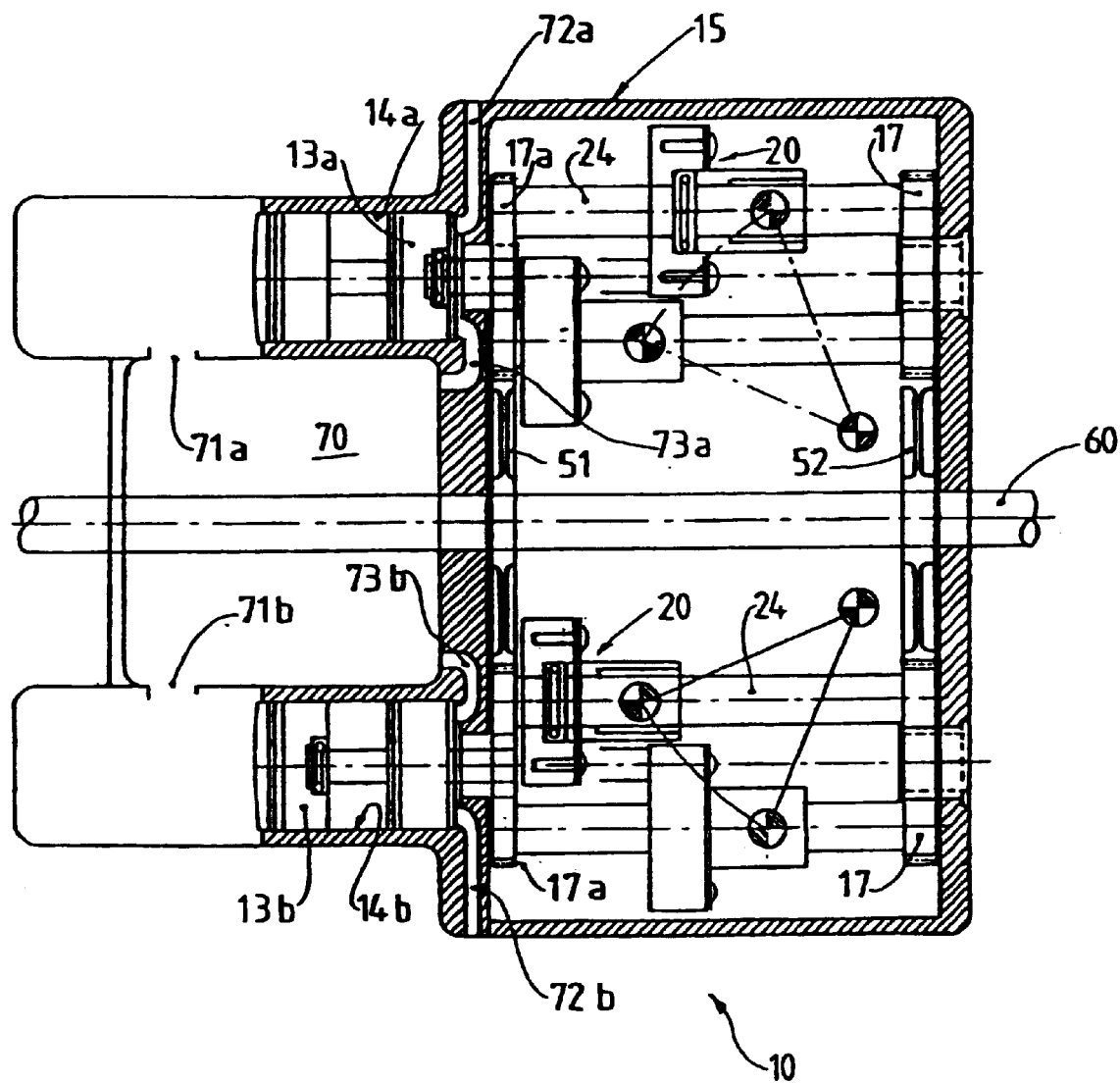
Figure 19:
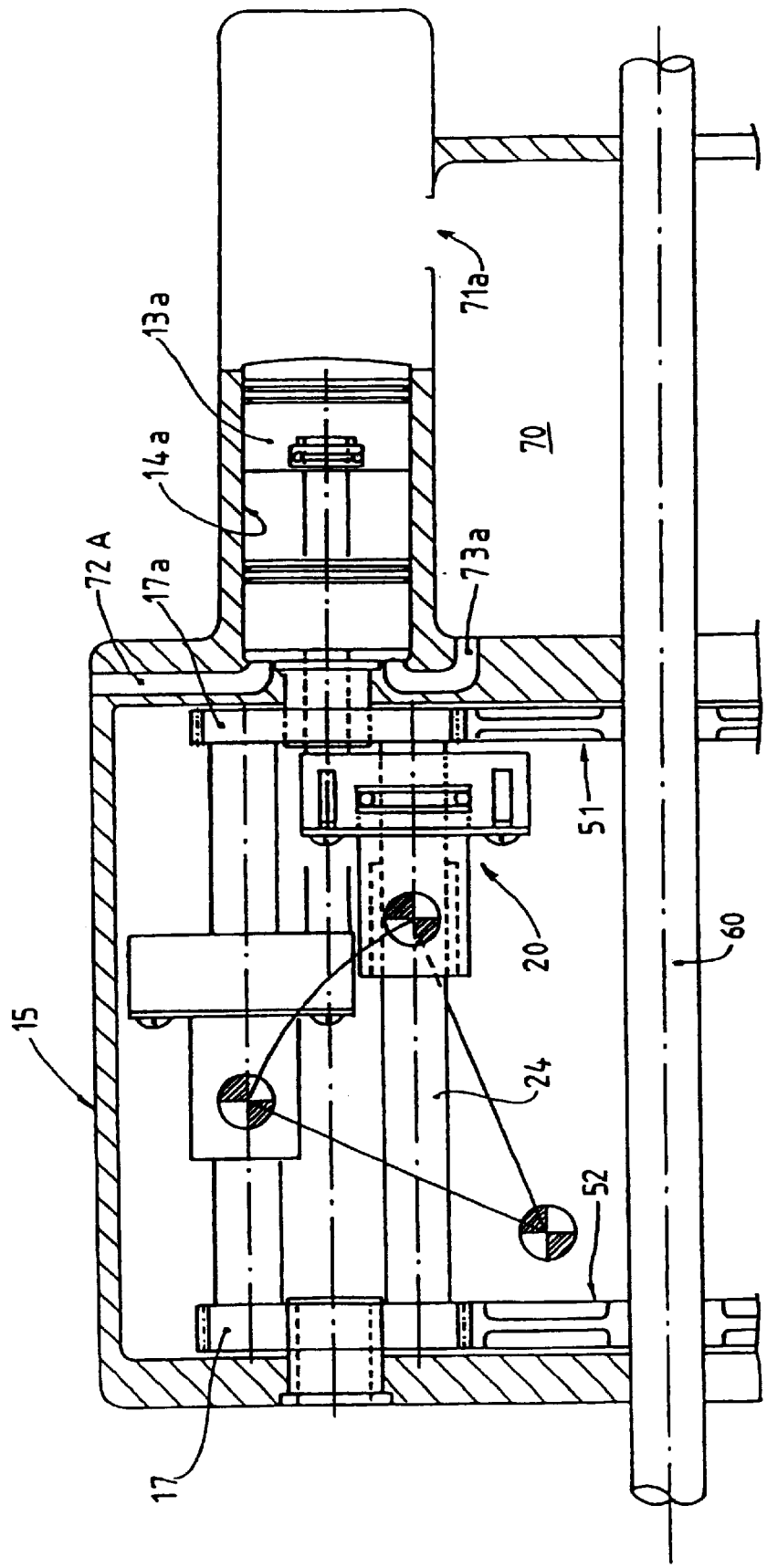
Figure 20:
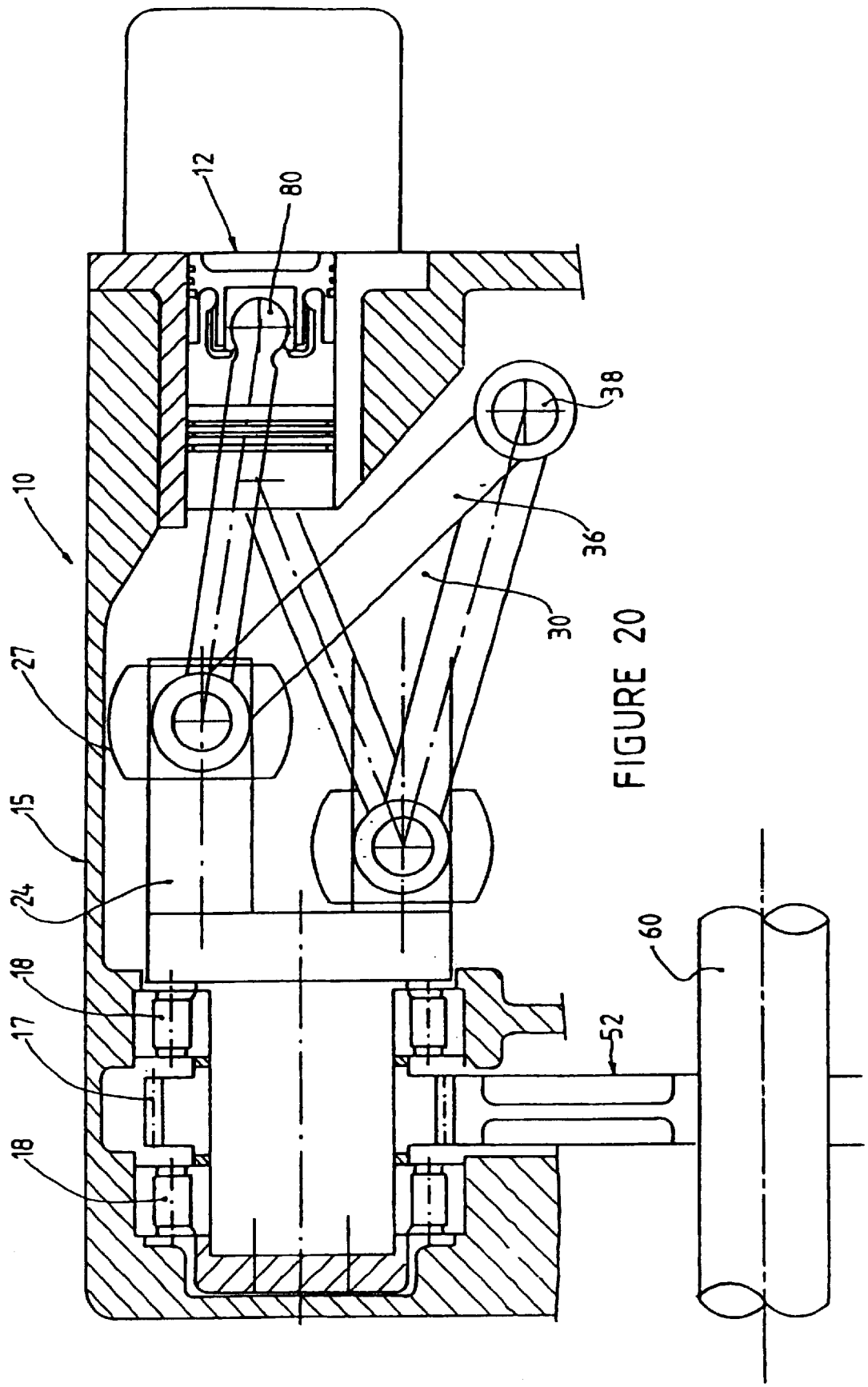
Figure 21:
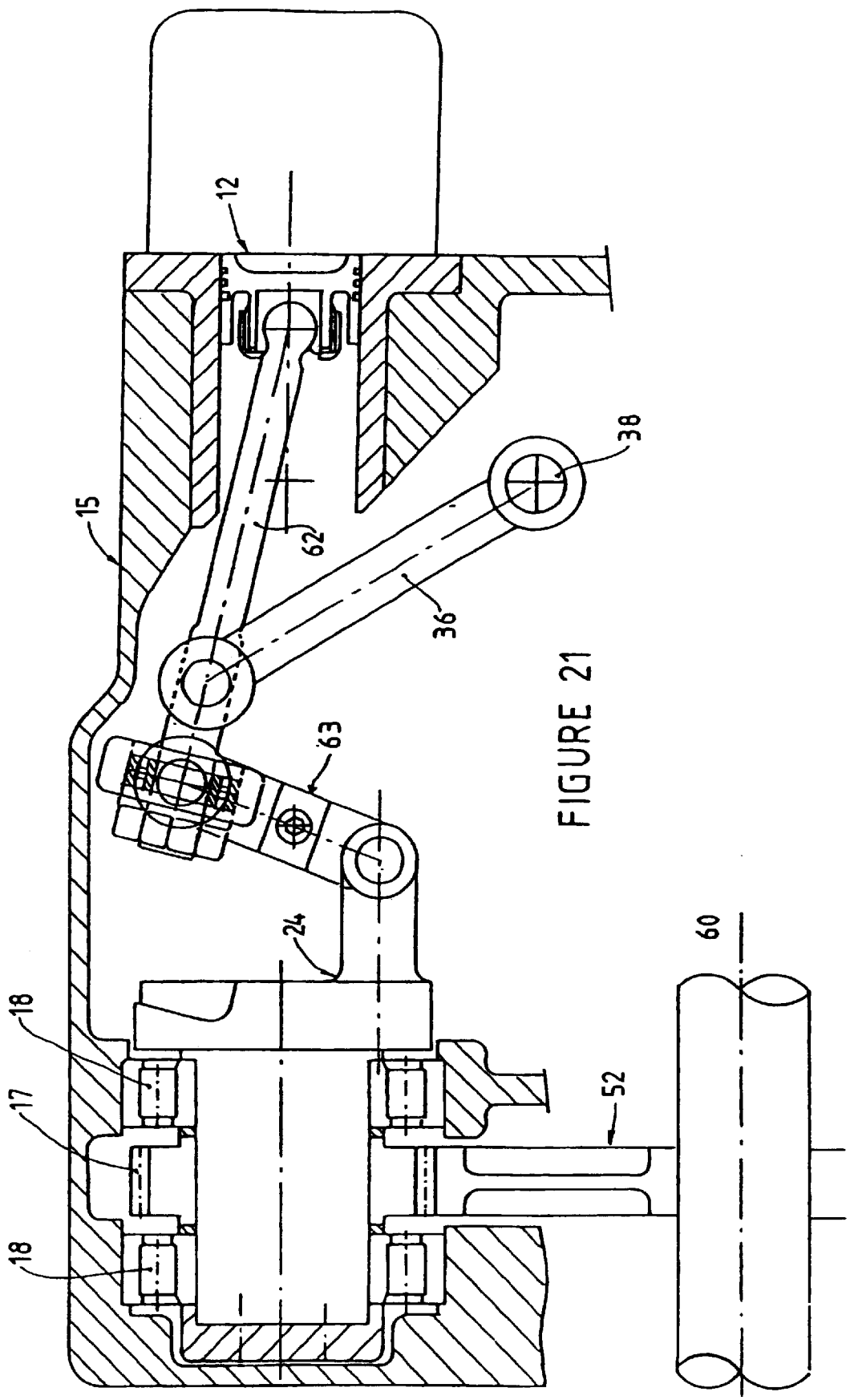
Figure 22:
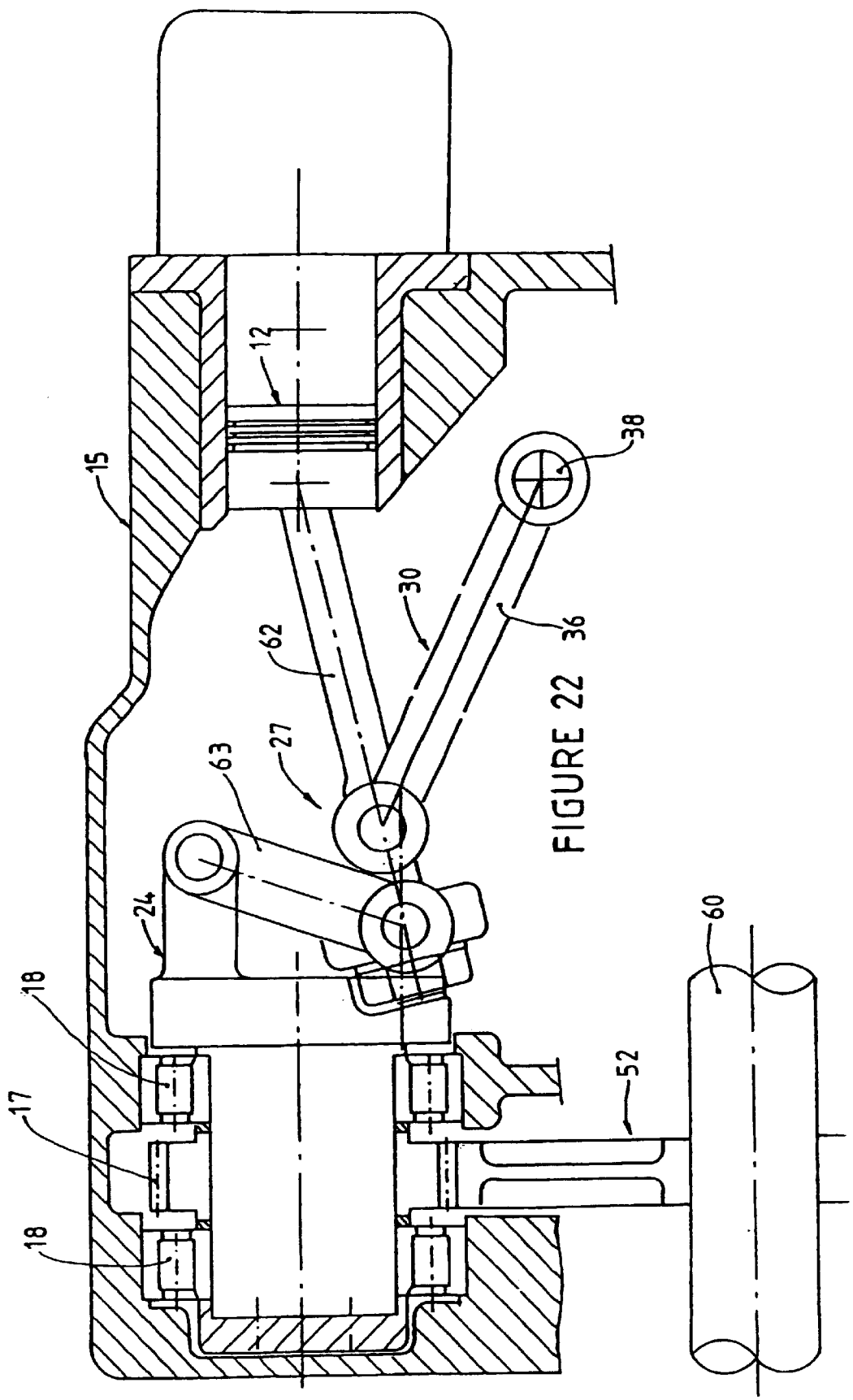

FIG. 18 is a schematic partial side elevation of a further form of converter according to the present invention;

FIG. 19 is a more detailed view of part of the converter shown in FIG. 18;

FIG. 20 is a side elevation of a converter similar to that shown in FIG. 15; and FIGS. 21 and 22 are schematic side elevations of a further form of converter according to the present invention.

Figure 23:
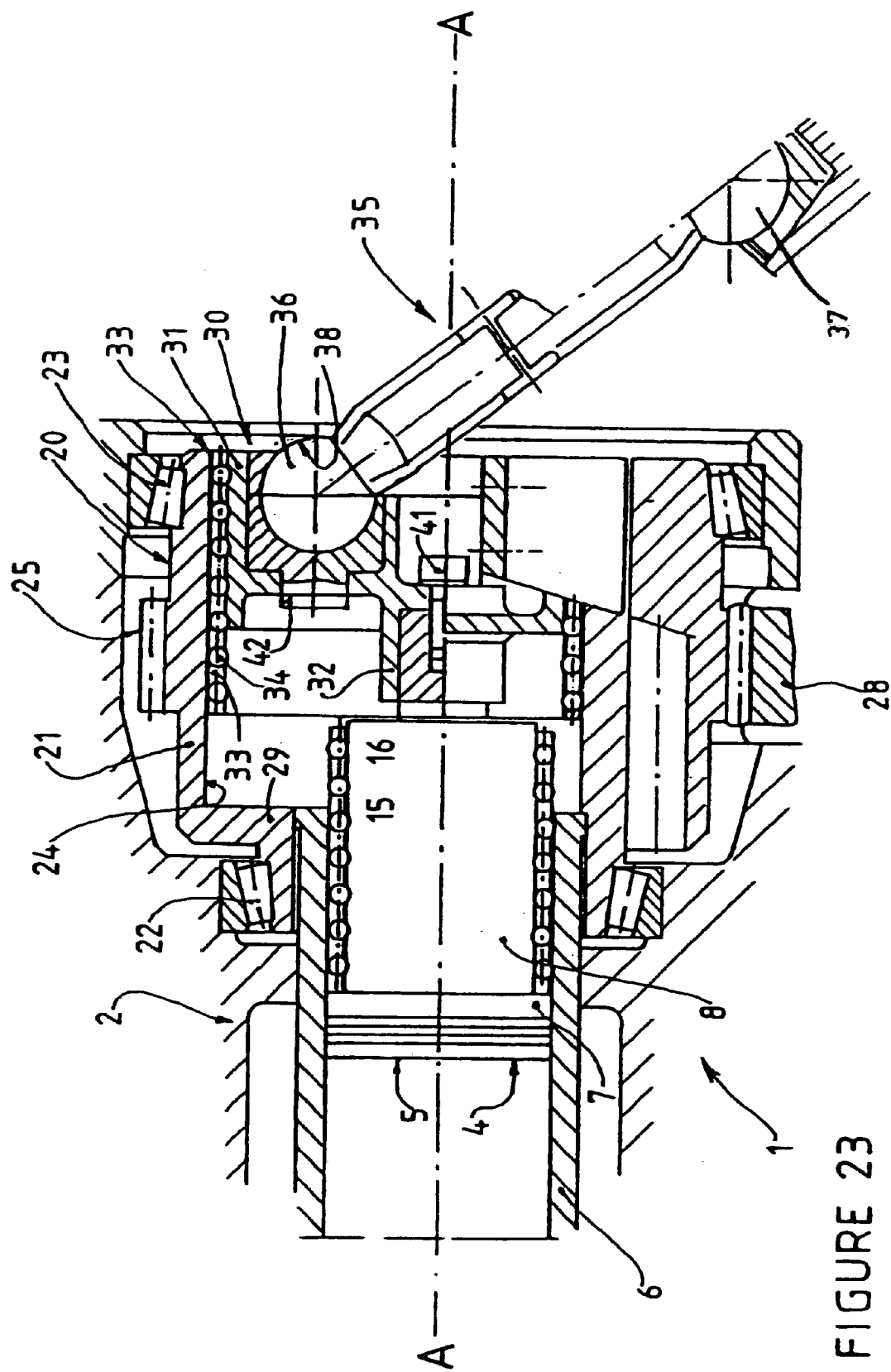
Figure 24:
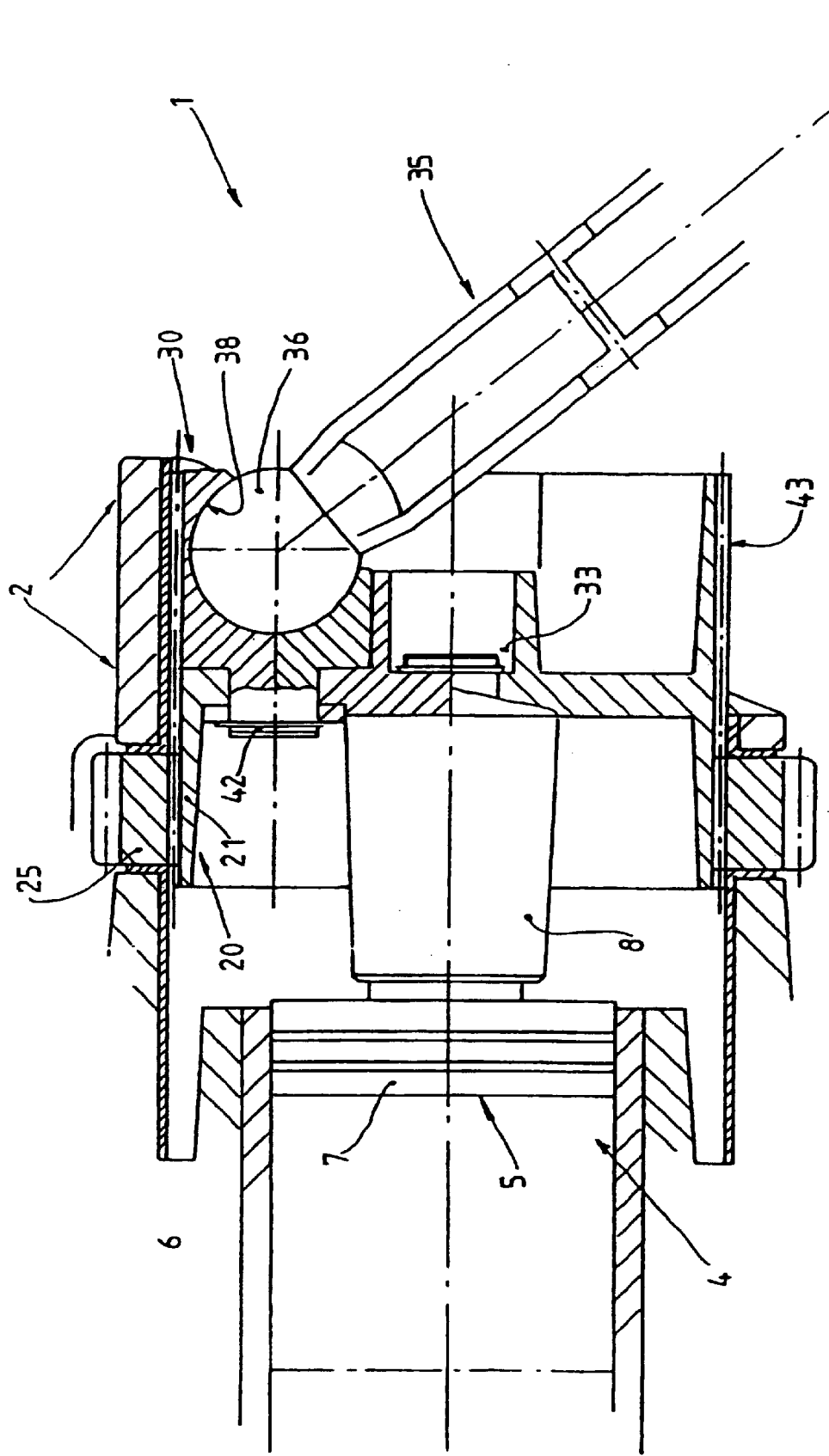
Figure 25:
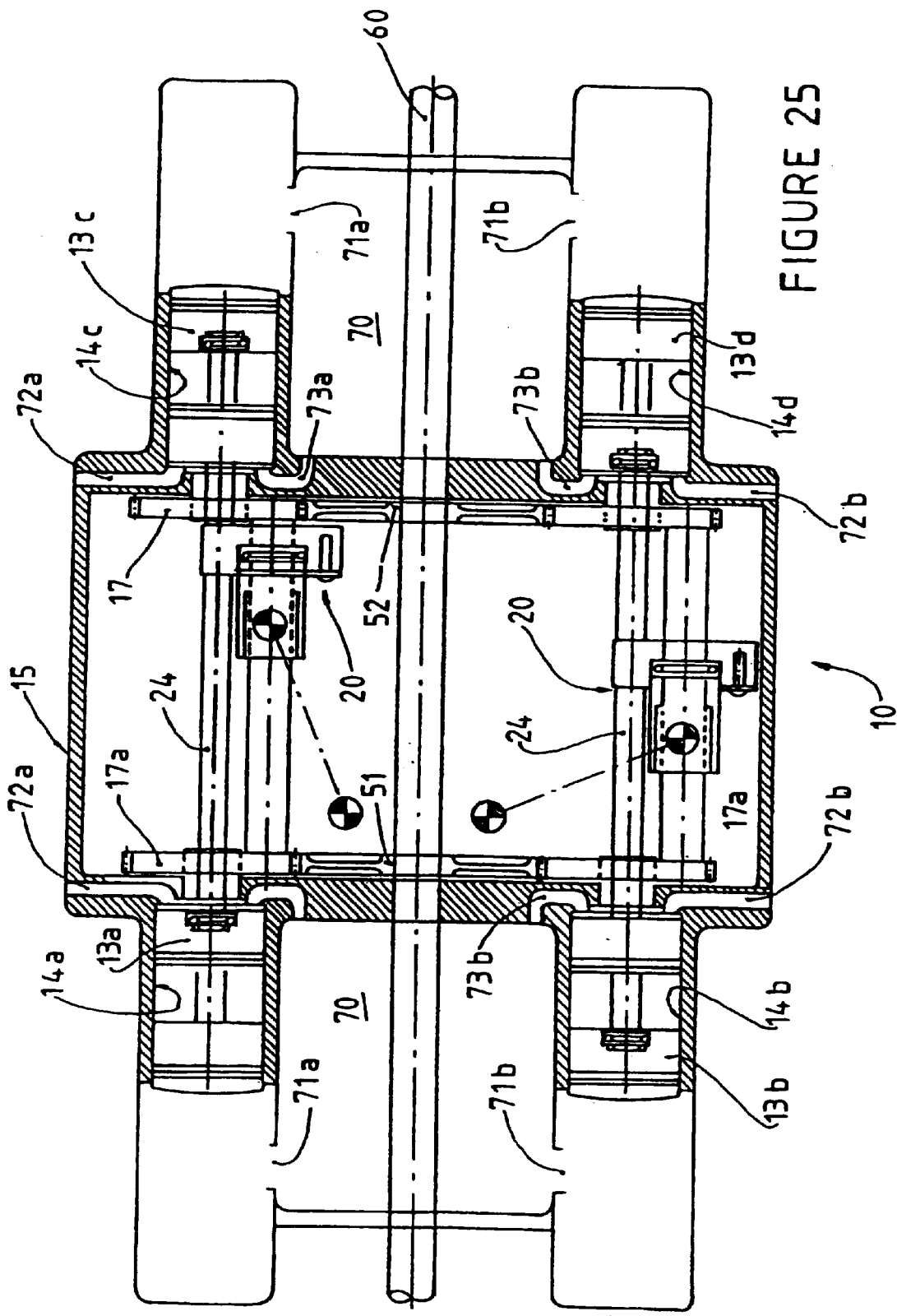
Figure 26:
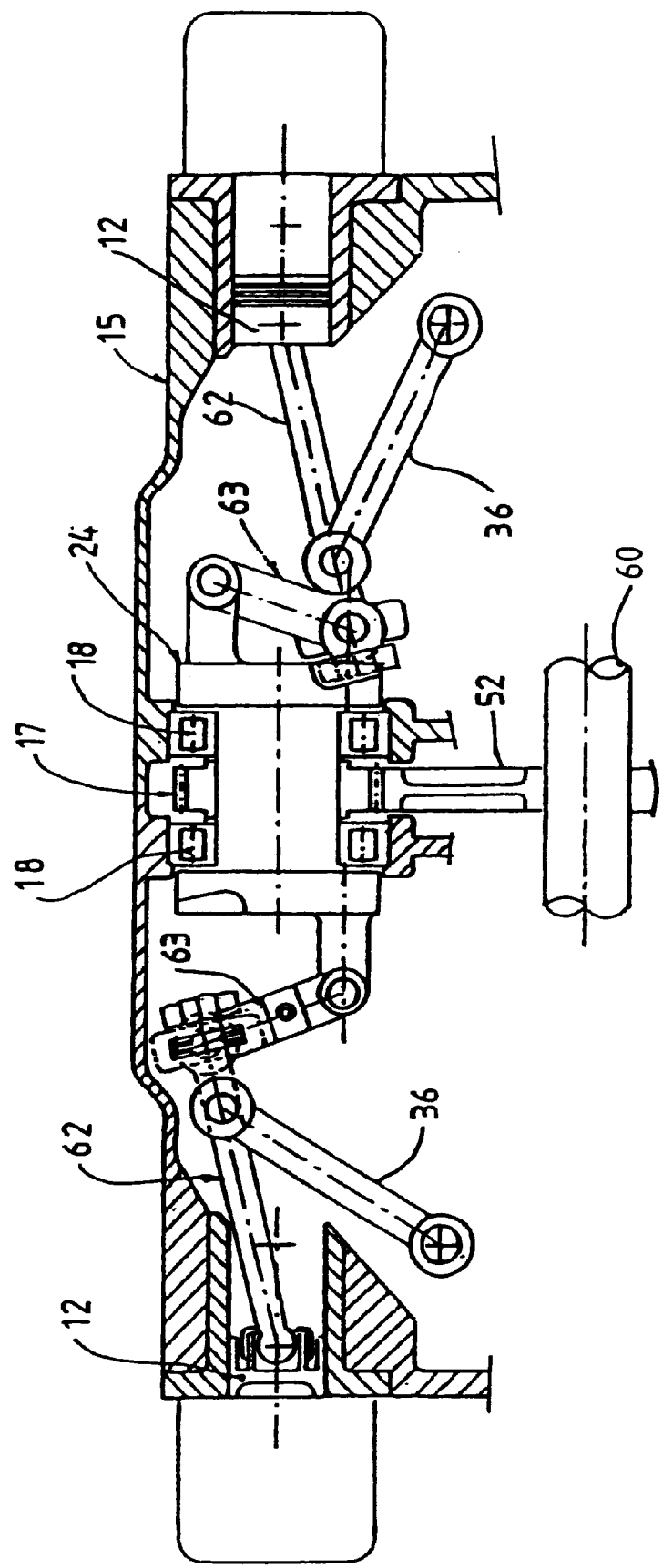

FIG. 23 is a schematic sectional side elevation of a rotary/linear converter according to the print invention;

FIG. 24 is a schematic side elevation of another form of rotary/linear converter according to the present invention;

FIG. 25 is a schematic partial side elevation of a modified form of converter shown in FIG. 18; and, FIG. 26 is a schematic side elevation of a modified form of the converter shown in FIGS. 21 and 22.

Referring to FIG. 1 of the drawings there is shown a rotary linear converter generally indicated at 10 comprising a reciprocator 12 in the form of a piston 13 which is receivable within a cylinder 14 which is formed as part of the housing 15 of the apparatus.

The converter includes a rotator 16 in the form of a gear wheel 17 mounted for rotation about the main axis A—A the gear wheel 17 being supported by bearings 18 and externally accessible through slot 11.

The apparatus further includes converter means 20 which in the form shown in FIG. 1 comprises a unitary body 22 including a reciprocating section 23, a rotating section 24 and a control section 27. The reciprocating section 23 is connected to piston 13 through a bearing (not shown) so that it can rotate relative thereto. The arrangement may be such that the piston is prevented from rotating. In the embodiment of FIG. 1 the rotating section 24 is oval shaped in cross-section although it could be any other suitable cross-section or splined, and is at least partially receivable within aperture 19 in the gear wheel 17 so as to be capable of reciprocating movement relative thereto.

The control section 27 includes an eccentric disk 28 located between thrust bearing elements which as shown are in the form of disks 29.

The apparatus further includes link mechanism 30 comprising a pair of links 36 (only one being shown) each having one end connected to a fixed mounting 38 and the other to a coupling mounting 32 comprising a collar 33 and mounting boss 34. As shown the mounting boss is at the top of the collar. It will be appreciated that more than one mounting boss could be provided and the or each boss could be at the sides, bottom or any other position. In some cases only one link may be required.

As the shaft 22 reciprocates the link is caused to pivot or oscillate forward and backward as well as in an upwards and downwards motion thereby imparting an orbital motion to the eccentric disk 28 about the central axis A—A which in turn causes rotation of shaft 24 and thereby rotates the gear wheel 17.

The embodiment of FIG. 2 is essentially the same as that shown in FIG. 1 except that an additional piston 13a is operatively connected to section 24 via connecting rod 23a. FIG. 2 also provides a detail of one manner of connection of member 23, 23a to the piston. It will be appreciated that this connection can be used in connection with all embodiments described. The arrangement comprises a ball 60 mounted in a bearing 61 thereby permitting relative rotation between member 23, 23a and the piston as well as limited universal movement. The ball 60 need not be spherical but could be generally of oval or other suitable shape.

In the embodiment of FIG. 3 two gear wheels 17a and 17b are provided. Shaft sections 24a and/or 24b may be connected to a piston or pistons in a similar fashion to that shown in FIG. 2. Alternatively, the arrangement may be such that power can be transmitted from one gear to the other.

FIG. 4 is a sectional side elevation of the mounting 32. The collar 33 has a mounting aperture for receiving disk 28 and the mounting boss has an aperture 35 therein for receiving a link pin to which the link 36 is attached.

With reference to FIG. 5 the apparatus is similar to that described with reference to FIG. 1 and the various parts have been given the same numbers as provided in the description of FIG. 1. It will be noted that the arrangement of FIG. 5 differs from FIG. 1 in that the rotating section 24 is offset with respect to the main axis A—A and the gear wheel 17 is mounted on a central independent shaft 40. Shaft 40 may be used as an additional output shaft if desired.

The operation of the device is essentially the same as that described with reference to FIG. 1.

In the modified form shown in FIG. 6, the rotating section comprises two shafts 24a and 24b, each being offset with respect to the main axis A—A and each being mounted for reciprocating movement relative to gear wheel 17 via apertures 19a and 19b. It will be appreciated however that more than two shafts may be provided.

FIG. 7 shows another modified form of the device shown in FIG. 5 wherein shaft 40 extends through gear wheel 17 and is connected to coupling part 27. In this arrangement shaft 40 can be splined or non-circular act so as to assist in rotating gear wheel 17.

In the embodiments shown in FIGS. 8 and 9 like reference numerals have been used to describe like parts referred to in the earlier described embodiments. The assemblies of FIGS. 8 and 9 differ from the earlier described embodiments in that the control section 27 is adapted to slide on shaft 24 so as to effect rotation of that shaft about the central axis and therefore cause rotation of the gear wheel 17.

As shown in FIGS. 8 and 9 the shaft 23 extends through a bearing 60 in the housing. This bearing 80 has a projecting portion 81 which projects beyond the housing wall. In the embodiment of FIG. 8 the shaft 24 has a plate 63 attached to its end, the plate having an aperture therein for receiving the projection portion 81 of the bearing 80. As a result the shaft 24 is supported by the bearing portion 61 during its revolving motion.

In the embodiment of FIG. 10 the plate 63 is replaced by a bearing 65 which is arranged to track on bearing portion 81 as the shaft 24 revolves.

In the embodiment of FIG. 11 the reciprocating section and rotating section are defined by the same shaft 23. The rotator 17 is fitted onto the shaft 23 by means of a polygon-type shaft connector or spline which permits both fixed and sliding connection between the shaft 23 and the rotator 17; that is the shaft 23 is free to slide relative to the rotator in the direction of the main axis but is caused to rotate with the rotator 17. In this embodiment a support member in the form of shaft 70 assists in supporting the assembly. With reference to FIG. 11 the link 36 may be adapted to swing both to the left and the right of the upright position as shown in the drawings. This arrangement enables it to be possible to obtain 360° of rotation from a single stroke of the reciprocator. This arrangement therefore provides for a much longer stroke.

In the embodiment of FIG. 12 the rotating section 24 is telescopically receivable within reciprocating section 23 but fixed against rotation relative thereto. As can be seen shaft section 24 is over shaped and receivable within a complimentary shaped aperture in section 23. It will be appreciated that the shaft could be splined.

In embodiment of FIGS. 13 and 14, the arrangement is similar to that shown in FIGS. 8 and 10. In this embodiment, an additional gear 17a is provided and rotation of this gear is caused by rotation of part 24 in addition to gear 17. The gear 17a is bolted to control section 27 and caused to rotate therewith.

Referring to the particular embodiment of FIG. 15, the reciprocating section 23 of the converter means 20 is in the form of a piston connecting rod which is pivotally connected at one end to the piston 12. The other end of piston connecting rod 23 is pivotally connected to the control section 27 of the converter means 20. The control section 27 is in the form of a sleeve slidable with respect to rotating section 24 which in turn is fixedly connected to gear wheel 17. It will be appreciated that reciprocation of piston 12 causes the control section 27 to slide along rotating section 24 which as a result of link 36 causes rotation of the section 24 about central axis A—A.

In the embodiment shown in FIG. 16 the rotating section 24 is supported at one end in bearing part 78. Rotating section 23 extends through the bearing part and is operatively connected to control section 27 which is slidably mounted to section 24. It will be appreciated that the various parts of the control section could be formed as separate integers and subsequently attached together.

The embodiment shown in FIG. 17 is substantially the same as that shown in FIG. 3 except that the two parts 24a and 24b are connected to the control section 27 in the manner shown. This arrangement is a much simpler form to that shown in FIG. 3.

FIG. 18 shows a multi-piston rotary linear converter 10. The pistons 13A and 13B are disposed within respective cylinders 14A and 14B which are formed as part of a common housing 15. The converter means 20 associated with each piston is mounted on a shaft 24 which is connected between gears 17 and 17a in a similar manner to that shown in FIG. 13. The gears 17 and 17a are linked with gears 51 and 52 which in turn are connected to output shaft 60. By the two spaced apart gears 17 and 17a the section 24 is supported at both ends thereby enabling the whole structure to be made lighter. FIG. 19 is a more detailed view of part of the device shown in FIG. 18. The device operates in a similar fashion to that shown in FIG. 13. It will be appreciated that more than two pistons/cylinder assemblies could be provided as shown in FIG. 25 which includes additional pistons 13C and 13D disposed in cylinders 14C and 14D. In the device shown in FIGS. 18, 19 and 25, there may further be provided a plenum chamber 70 (two in FIG. 25) which is adapted to contain compressed air for delivery to the cylinder via feed ports 71A and 71B. Air is drawn into the system by the pumping action of the piston via feed channels 72A and 72B and passed into the plenum or chamber 70 via transfer channels 73A and 73B. Suitable valving is provided in the channels. Thus, the device can provide for a turbo-charging or super-charging facility.

The embodiment shown in FIG. 20 is similar to that shown in FIG. 15 but includes more detail of the output shaft 60 and its relationship to the apparatus. Like numerals have been used to describe like parts as used in FIG. 15. As shown in the embodiment of FIG. 20 the connecting rod is operatively connected to the piston through a ball joint 80.

FIGS. 21 and 22 show a modified form of rotary/linear converter. In this embodiment the piston 12 has associated therewith a connecting rod 62 which is operatively connected to a coupling link 63 which in turn is pivotally connected to rotating section 24. Control link 36 is also operatively connected to connecting rod 62. As a result of reciprocation of piston 12 link 63 in association with link 36 cause rotation of member 24 which in turn causes rotation of gear 17 which is operatively connected to gear 52 which causes rotation of output shaft 60.

The embodiment of FIG. 26 is similar to that of FIG. 21 except that an addition piston/cylinder assembly is provided. There is also an additional coupling link and control link.

Referring to FIG. 23 of the drawings the rotary/linear converter generally indicated at 1 comprises a main body 2. A reciprocator 4 in the form of a piston 5 is disposed within a cylinder 6 which forms part of the main body 2. The piston 5 is adapted for reciprocating movement in the direction of the central axis A—A. The piston 5 includes a piston head 7 and a connecting section 8.

The converter further includes a rotator 20 comprising a rotating wheel 21 having an internal chamber 24 therein. The wheel 21 is supported within the main body 2 by means of support rollers or bearings 22 and 23. A gear wheel 25 is provided on the outer surface of the rotator 20 which engages a further gear 28. The wheel 21 comprises a generally cylindrical element with the chamber 24 opening at one side thereof and being partially closed at the other end by a flange 29. The connecting section 8 extends through an opening at the flange end 29 of the wheel 21 into chamber 24. The connecting section 8 is supported within cylinder 6 through a roller cage 15 having rollers 16 therein.

The control converter member 30 comprises a coupling body 31 which includes a piston mounting section 32 and an outer guide section 33 which includes a roller cage 33 having rollers 34 therein. The piston mounting section 32 receives the end of connecting section 8 the parts being releasably secured together by fastening bolt 41. The outer guide section 33 is similar in construction to that described with reference to the piston.

A control link 35 has a first ball joint 36 connected to socket 38 which is operatively connected to or forms part of the coupling body 31 and a second ball joint 37 which is disposed within the fixed and relocatable or continuously movable mounting. As shown socket 38 is receivable within a recess in the coupling body and is held in place by circlip 42. In operation reciprocating movement of the piston 5 causes reciprocating movement of control member 30. As the control member moves linearly its motion is controlled by link 35 which causes it to rotate. Because of the manner of connection between the control member 30 and wheel 21, the wheel is also caused to rotate.

Referring to FIG. 24 there is shown another form of converter according to the present invention. Where possible like reference numerals as used to describe the embodiment of FIG. 1 have been used to describe like parts of the embodiment of FIG. 2.

The embodiment of FIG. 24 is similar to that shown in FIG. 23 except that rotating wheel 21 and converter coupling body 30 are the same member which is mounted for reciprocating movement as well as rotating movement within the main body 2 of the converter.

The wheel 21/converter member 30 has a splined outer surface 43 which is engagable with gear 25 so that it can reciprocate relative thereto but will cause rotation thereof. The control link 35 is in essence the same as that described with reference to FIG. 23.

Finally it is to be understood that various alterations, modifications and/or additions may be incorporated into the various constructions and arrangements of parts without departing from the spirit or ambit of the invention.

I claim:

1. A rotary/linear converter comprising a reciprocator having a main axis and which reciprocates in order to positively claim the relationship between two claimed elements in the direction of the main axis and a rotator which rotates about the main axis, the converter further including means for operatively interconnecting the reciprocator and the rotator, said interconnecting means comprising a first section operatively connected to the reciprocator in a region substantially co-axial with the main axis thereof, a rotating section operatively connected to the rotator, a control section, and a control link having one end portion thereof pivotally connected to said control section with its pivot axis offset with respect to said main axis and another end portion pivotally connected to a mounting, said link adapted to pivotally oscillate about said mounting in response to movement of one of said rotator and reciprocator thereby causing movement of the other of said rotator and reciprocator, said rotating section of said interconnecting means having a longitudinal axis which is offset from the main axis and which revolves about said main axis.

2. A rotary/linear converter according to claim 1 wherein said first section comprises an elongated member which is disposed substantially co-axially with said main axis.

3. A rotary/linear converter according to claim 1 wherein the reciprocator comprises a piston disposed within a cylinder for reciprocating movement relative thereto.

4. A rotary/linear converter according to claim 1 wherein the rotator comprises at least one wheel mounted for rotation about the main axis of the reciprocator.

5. A rotary/linear converter according to any one of claims 1 to 4 wherein the rotating section of the interconnecting means comprises a shaft or rod having one end operatively connected to the reciprocator.

6. A rotary/linear converter according to claim 5 wherein the shaft or rod of the interconnecting means is operatively connected to the rotator so that it reciprocates in order to positively claim the relationship between two claimed elements relative thereto as well rotates therewith.

7. A rotary/linear converter according to any one of the claims 1 to 4 wherein the control link has one end connected to a mounting which comprises a collar or sleeve forming a bearing or bushing for receiving the control section and providing for limited rotary movement therebetween, the other end of the link being mounted to a fixed pivotal mounting.

8. A rotary/linear converter according to claim 7 wherein the position of the fixed mounting is adjustable during operation of the application.

9. A rotary/linear converter comprising a reciprocator having a main axis and which reciprocates in order to positively claim the relationship between two claimed elements in the direction of the main axis, and a rotator which rotates about the main axis, the converter further including means for operatively interconnecting the reciprocator and the rotator, the interconnecting means comprising a first member operatively connected to the reciprocator in a region substantially co-axial with the main axis, a rotating section operatively connected to the rotator, a coupling link pivotally interconnected between the first member and the rotating section, and a control link having one end portion operatively connected to the first member and another end portion connected to a mounting, said control link pivotally oscillates about the mounting in response to movement of one of said rotator and reciprocator thereby causing movement of the other of said rotator and reciprocator.

10. A rotary/linear converter according to claim 9 wherein said first section of the interconnecting means comprises a connecting rod operatively connected between said reciprocator and one end of said coupling link, said aforementioned end portion thereof being pivotally connected to the first section of the interconnection means between the reciprocator and the coupling link.

11. A rotary/linear converter according to claim 10 wherein said the rotating section of the interconnecting means has a longitudinal axis which is offset from the main axis of the rotating section and which resolves about the main axis.

12. A rotary/linear converter comprising a main body, a reciprocator which comprises a piston having a main axis and being disposed within a cylinder for reciprocating movement therein in the direction of the main axis and a rotator adapted for rotating movement about the main axis, said piston comprising a piston head and connecting section which is operatively connected to a control member, said connecting section including a rotating section which is rotatable relatively to the piston head and a guide section which operatively engages the inner surface of the cylinder, said control member reciprocates relative to the rotator but also rotates therewith, and converter further comprising a control link having one end portion thereof pivotally connected to the control member with its pivot axis offset with respect to the main axis and another end portion pivotally connected to a mounting, said control link pivotally oscillates about the mounting in response to movement of one of said rotator and reciprocator thereby causing movement of the other said rotator and reciprocator.

13. A rotary/linear converter according to claim 12 wherein said cylinder is disposed within or forms part of the main body of the converter.

14. A rotary/linear converter according to claim 12 wherein said guide section includes a guide sleeve with a roller cage and rollers disposed between the guide sleeve and the inner surface of the cylinder.

15. A rotary/linear converter according to claim 14 wherein said rotator comprises a wheel operatively carried by the main body of the converter and mounted for rotation about the main axis of the reciprocator.

16. A rotary/linear converter according to claim 15 wherein said wheel comprises a gear or pulley or the like.

17. A rotary/linear converter according to claim 16 wherein said wheel comprises a generally cylindrical member having a chamber therein for receiving the control member and permitting reciprocating motion thereof in the direction of the main axis, wherein said control member is inhibited against rotation relative to the wheel.

18. A rotary/linear converter according to claim 17 wherein the control member comprises a coupling body operatively connected to the reciprocator via the connecting section, for permitting reciprocating movement therewith, said coupling body being disposed within the chamber within the rotator wheel and mounted so as to be movable relative thereto in the axial direction but fixed against relative rotation.

19. A rotary/linear converter according to claim 18 wherein said control link comprises an elongated member having a first ball joint operatively connecting one end of the link to the coupling body and a second ball joint operatively connecting the other end of the link to a mounting and wherein the pivot axes of the ball joints are offset with respect to the central axis of the reciprocator, said first ball joint being receivable within a socket element mounted to the coupling body.

20. A rotary/linear converter comprising a reciprocator having a main axis and which reciprocates is order to positively claim the relationship between two claimed elements in the direction of the main axis and a rotator which rotates about the main axis, the converter further including means for operatively interconnecting the reciprocator and the rotator, said interconnecting means comprising a first section operatively connected to the reciprocator in a region substantially co-axial with the main axis thereof, a rotating section operatively connected to the rotator, a control section operatively connected to said first section in spaced relation to said reciprocator, and a control link having one end portion thereof pivotally connected to said control section with its pivot axis offset with respect to said main axis and another end portion pivotally connected to a mounting, said control link being adapted to pivotally oscillate about said mounting in response to movement of one of said rotator and reciprocator thereby causing movement of the other of said rotator and reciprocator, said rotating section of the interconnecting means having a longitudinal axis which is coaxial with the main axis.

21. A rotary/linear converter according to claim 20 wherein said first section comprises an elongated member which is disposed substantially co-axially with said main axis.

22. A rotary/linear converter according to claim 21 wherein the reciprocator comprises a non-rotatable piston disposed within a cylinder for reciprocating movement relative thereto.

23. A rotary/linear converter according to claim 22 wherein the rotator comprises at least one wheel mounted for rotation about the main axis of the reciprocator.

24. A rotary/linear converter according to claim 20 wherein the first section and rotating section of the interconnecting means comprise a shaft or rod having one end operatively connected to the reciprocator.

25. A rotary/linear converter according to claim 24 wherein the shaft of said interconnecting means is journalled to the reciprocator so that it can rotate relative thereto and the longitudinal axis of the shaft is co-axial with the main axis of the first section.

26. A rotary/linear converter according to claim 24 wherein the rotating section of the interconnecting means comprises a shaft or rod operatively connected to the rotator so that it reciprocates relative thereto as well as rotates therewith.

27. A rotary/linear converter according to claim 26 wherein the shaft of the rotating section is disposed substantially co-axially with the main axis of the reciprocator and arranged such that it will be caused to rotate with the rotator.

28. A rotary/linear converter according to claim 27 wherein the interconnecting means comprises a unitary body forming the reciprocating, rotating and control sections thereof, the control section comprising a disk-like element having a central axis offset from the longitudinal axis of at least one of the reciprocating and rotating sections which in turn are co-axial, the coupling disk being arranged so that, in use, it is caused to adopt an orbital motion about the main axis of the reciprocator.

29. A rotary/linear converter according to claim 28 wherein the control link has one end connected to a mounting which comprises a collar or sleeve forming a bearing or bushing for receiving the control section and providing for limited rotary movement therebetween, the other end of the link being mounted to a fixed pivotal mounting.

30. A rotary/linear converter according to claim 27 wherein the position of the fixed mounting is adjustable during operation of the converter.

\* \* \* \* \*